(12) United States Patent
Vos

(10) Patent No.: US 6,327,003 B1
(45) Date of Patent: Dec. 4, 2001

(54) METHOD FOR CORRECTING FLICKER AND FLUTTER EFFECTS OF AN ON-SCREEN DISPLAY ON A VIDEO IMAGE

(75) Inventor: Mark Vos, Grenoble (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/415,547

(22) Filed: Oct. 8, 1999

(30) Foreign Application Priority Data

Oct. 9, 1998 (FR) .................................................. 98 12691

(51) Int. Cl.$^7$ ....................................................... H04N 5/50
(52) U.S. Cl. ............................. 348/569; 348/447; 345/467
(58) Field of Search .................... 348/569, 570, 348/563, 589, 600, 497, 607, 447, 910; 345/467; H04N 5/50

(56) References Cited

U.S. PATENT DOCUMENTS

| | | |
|---|---|---|
| 5,510,843 | 4/1996 | Keene et al. . |
| 5,608,425 * | 3/1997 | Movshovich .................. 345/141 |
| 5,638,112 | 6/1997 | Bestler et al. . |
| 5,640,502 | 6/1997 | Knox et al. . |
| 5,742,349 | 4/1998 | Choi et al. . |
| 5,859,634 * | 1/1999 | Ou et al. ................................ 345/213 |
| 6,057,888 * | 5/2000 | Bril ...................................... 348/553 |
| 6,198,468 * | 3/2001 | Cho ...................................... 345/141 |

FOREIGN PATENT DOCUMENTS

| | | |
|---|---|---|
| 0762331A2 | 3/1997 | (EP) . |
| 2292294A | 2/1996 | (GB) . |
| WO98/17056 | 4/1998 | (WO) . |
| WO98/17058 | 4/1998 | (WO) . |
| WO98/17066 | 4/1998 | (WO) . |

OTHER PUBLICATIONS

French Search Report dated May 27, 1999 with annex to French application No. 98/12691.

* cited by examiner

*Primary Examiner*—Michael Lee
(74) *Attorney, Agent, or Firm*—Lisa K. Jorgenson; Stephen Bongini; Fleit, Kain, Gibbons, Gutman & Bongini P.L.

(57) ABSTRACT

A method is provided for correcting flicker and flutter of an OSD on a video image. According to the method, values of pixels of the OSD are stored, pixels of lines of the OSD that are to be displayed without processing are substituted for pixels of the video image, and pixels of lines of the OSD that are to be displayed after processing are subjected to a mathematical filter. In the subjecting step, the value of another pixel of the video image is assigned to each pixel of the video image that is required by the mathematical filter but presently unavailable, with the other pixel belonging to the same column as the required pixel. In a preferred embodiment, the required pixel is a pixel of the video image that is not covered by the OSD, and the other pixel belongs to the closest line of the video image that is covered by the OSD. This makes it possible to simplify the use of mathematical filters associated with a unique equation for all of the lines of the overlaid OSD. A device for overlaying an on-screen display (OSD) on a video image is also provided.

20 Claims, 1 Drawing Sheet

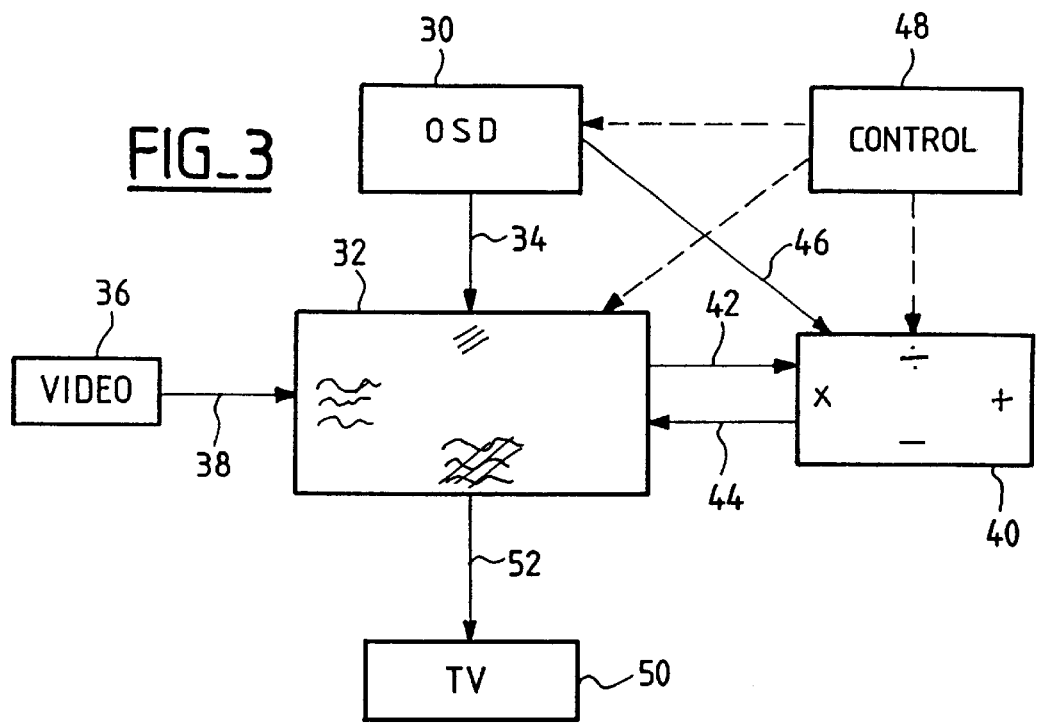
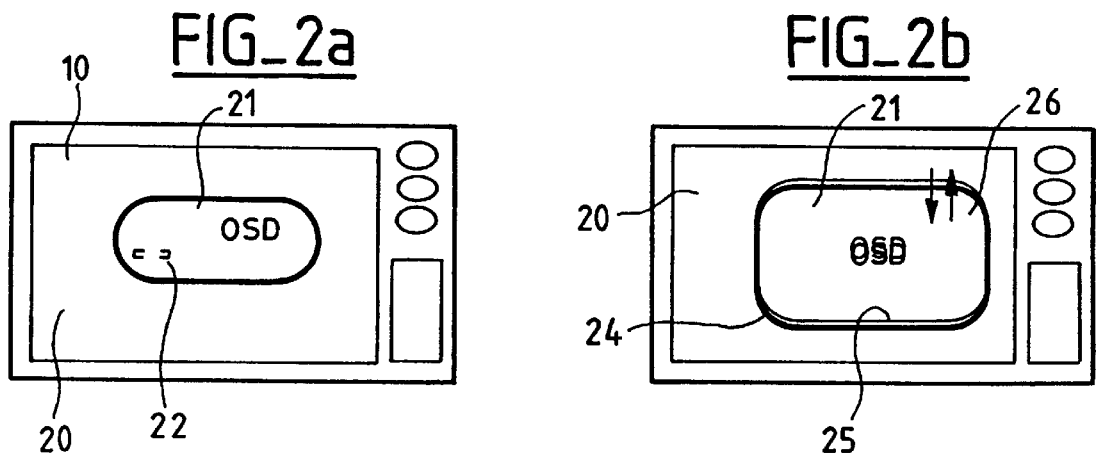
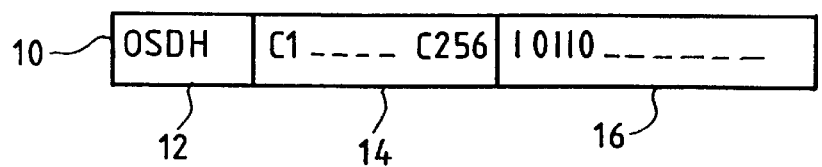

METHOD FOR CORRECTING FLICKER AND FLUTTER EFFECTS OF AN ON-SCREEN DISPLAY ON A VIDEO IMAGE

CROSS-REFERENCE TO RELATED APPLICATIONS

This application is based upon and claims priority from prior French Patent Application No. 98-12691, filed Oct. 9, 1998, the entire disclosure of which is herein incorporated by reference.

BACKGROUND OF THE INVENTION

1. Field of the Invention

The present invention relates to displays, and more specifically to a method for correcting flicker and flutter effects of an on-screen display overlaid on a video image by assigning new values to the pixels of certain lines of the on-screen display based on the neighboring pixels of the video image.

2. Description of Related Art

A video image is formed by a sequence of lines of pixels. The pixels are elementary picture elements. In color television systems, each pixel is a carrier of luminance information and chrominance information that makes it possible to specify the luminosity and color of each image point. In the most commonly used television systems, the image develops according to a principle of horizontal scanning of the screen. Whether it is the NTSC television system, the PAL television system, or the SECAM television system, each image displayed results from the alternating display of two distinct partial images known as frames. In general, there is a first frame, which is known as an odd-parity frame, and a second frame which is known as an even-parity frame.

The very nature of television images (i.e., the interlacing of two partial images) gives rise to problems of image quality and flicker. In an extreme case, a line of black pixels on a white image background gives the human eye the unpleasant impression of appearing and disappearing, especially if this line is observed from a close distance. Furthermore, it is increasingly common to present on-screen displays (OSDs) that are overlaid on video images. Each pixel of an OSD is characterized by three values Y, U, and V that determine luminosity and color and a value MW for transparency. For example, OSDs are commonly used to provide a permanent or non-permanent indication of the progress of a sporting event, such as the score of a match. OSDs are also used by certain television channels to show their logo so as to indicate to the viewer the television channel that is being watched.

FIG. 1 shows a conventional structure for the code of an OSD. A binary train 10 containing the codes needed to display an OSD typically consists of three sets of bits that have different functions. A first set of bits 12 forms the OSD header. The OSD header 12 has information on the number of bits needed to define a pixel, and information on the coordinates of certain characteristic points of the OSD. A second set of bits 14 is used to define the panel of colors that will be used during the display of the OSD. All of the colors that will be used are stored in a memory known as a color look-up table (CLUT).

Generally, the CLUT is limited to 256 memory lines, with each memory line containing the values of the bits corresponding to a color programmed in a table through the second set of bits 14. The choice of the size of the color look-up table results from a compromise between the access speed of the table and the number of colors needed to provided accurate quality for the OSD. Additionally, a third set of bits 16 is formed by the addresses of the memory lines of the table of the available colors containing the appropriate color for each pixel of the OSD.

While flicker problems exist, in purely analog television pictures they are small as compared with the flicker phenomena that can appear when digital on-screen displays are presented on a video image background. In particular, the systematic attenuation of contrasts in video images, which is caused by the presence of cameras in the image generation cycle, is not encountered during the creation of an OSD. As a result, two patterns of colors that are distant from each other in the spectrum of visible frequencies may be juxtaposed. Thus, major contrasts may appear between two consecutive lines when digital on-screen displays are overlaid on the video image. Further, when an OSD is created, the background of the video image on which the OSD will be displayed is not generally known. Thus, in extreme cases, a blue OSD may be displayed when the background of the video image is red. Additionally, nothing prevents the designer of an OSD from juxtaposing two lines with high contrast with respect to each other in the OSD itself.

FIGS. 2a and 2b illustrate problems that can be encountered during the display of an OSD on a video image background. FIG. 2a shows a television screen 10 that is displaying an OSD 21 on a video image background 20. The OSD 21 shows a zone with a white background from which there emerges a thin black line with the width of a pixel. This is typically the case where the flicker effect is the most visible. Due to the interlacing of the even-parity and odd-parity frames, the thin black line 22 appears and disappears at a speed that is low enough for this phenomenon to be detected by the human eye.

FIG. 2b shows another problem related to the display of an OSD on a video image background. On the background of a video image 20, an OSD 21 is formed by a first pattern 24 that is displayed with the even-parity frame and a second pattern 25 that is displayed with the odd-parity frame. This gives an impression of flutter 26. More specifically, the OSD seems to rise and fall the amplitude of a pixel at a rate dictated by the refresh frequency of the frames of the image. This flutter problem has the same cause as the flicker problem. The phenomenon of flutter appears when the same image is displayed by the even-parity frame and by the odd-parity frame. Depending on the television system used, the even-parity frame appears every $\frac{1}{25}$ seconds or every $\frac{1}{30}$ seconds in alternation with the odd-parity frame. The human eye detects a flutter motion due to the appearance of the OSD alternately on one set of lines and then on the set of directly neighboring lines.

These phenomena of flicker and flutter are mainly perceived when long horizontal lines are displayed on the screen, which is frequent in OSDs. There are several conventional approaches to overcoming these problems of vertical transition in the definition of an image having one or more OSDs. For example, it is possible to act on the transparency of the pixel of an OSD. This approach is applied to the lines or groups of lines that constitute the borderline zone between an OSD and a video image. To avoid the sudden transitions of color that give rise to the phenomena explained above, it is also possible to apply mathematical filters that use the values of neighboring pixels and weighting to compute new values of these pixels.

The use of one such mathematical filter will now be explained. For a current line of pixels of an OSD to be processed, the values of the pixels of the neighboring lines are taken into account to determine new values for the pixels of the current line. For example, for a current line n of odd-parity frame I, the lines n and n−1 of the even-parity frame are taken into account. More specifically, for each pixel k of the current line of the OSD to be displayed in column i of the screen, the new values $I_i^*(n)$ of pixel k are computed from: (1) values $P_i(n)$ and $P_i(n-1)$ of the pixels of lines n and n−1 of the even-parity frame P of the OSD to be displayed in column i of the screen; and (2) old values $I_i(n)$ of the pixel k of the current line.

In this example, the new values $I_i^*(n)$ are obtained according to the following equation.

$$I_i^*(n) = a \times P_i(n-1) + b \times I_i(n) + c \times P_i(n) \quad (1)$$

where a, b, and c are weighting coefficients. The weighting coefficients are specific by their number and value to each mathematical filter. Their value ranges from 0 to 1 and the sum of all the weighting coefficients must be equal to 1. In this example, only the two pixel lines adjacent to the line of pixels being processed are considered. The new values $I_i^*(n)$ provide a line of pixels that does not have excessive contrast with the neighboring lines, and thus the risks of flicker and flutter within the OSD are diminished. Although the mathematical filters associated with equation (1) are generally quite efficient, it is also possible to apply mathematical filters that bring more than three lines of pixels into the computation.

While such mathematical filters are efficient within the OSDs, they cannot be applied to the lines of the OSD that constitute the boundary between the OSD and the original video image. This is because the values of the pixels of the video lines other than those of the current line are not available because they are not preserved in the memory. Thus, the filter associated with the equation (1) cannot be applied. That is, the values $P_i(n-1)$ are not available because they are the values of the pixels of an already displayed line of an original video image.

Similarly, a mathematical filter that, for current line n in each column i of the even-parity frame P, assigns the pixels the new values $P_i^*(n)$ according to equation (2) below cannot be applied to a line of an OSD that precedes a line of an original video image. In particular, the values $I_i(n+1)$ correspond to the line following the current line and are not available in any memory.

$$P_i^*(n) = a \times I_i(n) + b \times I_i(n) + c \times P_i(n+1) \quad (2)$$

Thus, when the line of pixels of the OSD being processed is a line marking the boundary between the OSD and the original video image, no account is taken of the values of the pixels of the lines directly adjacent to the current line. In other words, equations (1) and (2) become equations (3) and (4), respectively.

$$I_i^*(n) = a \times I_i(n) + b \times P_i(n) \quad (3)$$

$$P_i^*(n) = a \times I_i(n) + b \times P_i(n) \quad (4)$$

Consequently, if the lines of pixels of the original image directly adjacent to the OSD have a high contrast with the boundary lines of the OSD, the phenomena of flutter and flicker will still be present. In particular, the lines of pixels of the original video image do not play a role in the computation so no contrast attenuation is achieved with respect to the lines of the original video image. Furthermore, the impossibility of using the efficient mathematical filters associated with equations (1) and (2) for all the lines of the OSD necessitates the use of either less efficient filters for all the lines to be processed or different filters that are each adapted to the OSD line to be processed. This approach is complex to manage and requires a greater programming memory.

SUMMARY OF THE INVENTION

In view of these drawbacks, it is an object of the present invention to overcome the above-mentioned drawbacks and to provide a method for assigning values to selected pixels of an original video image when overlaying an OSD on the video image. When processing a line of pixels of the OSD, the values of the pixels of the corresponding line in the original video image are available. According to the method, these values of the pixels of the original video image are extrapolated to give values for related pixels of the video image that are needed to apply a mathematical filter but that are not presently available.

Another object of the present invention is to provide a method for correcting flicker and flutter of an OSD on a video image.

One embodiment of the present invention provides a method for correcting flicker and flutter of an OSD on a video image. According to the method, values of pixels of the OSD are stored, pixels of lines of the OSD that are to be displayed without processing are substituted for pixels of the video image, and pixels of lines of the OSD that are to be displayed after processing are subjected to a mathematical filter. In the subjecting step, the value of another pixel of the video image is assigned to each pixel of the video image that is required by the mathematical filter but presently unavailable, with the other pixel belonging to the same column as the required pixel. In a preferred embodiment, the required pixel is a pixel of the video image that is not covered by the OSD, and the other pixel belongs to the closest line of the video image that is covered by the OSD.

Another embodiment of the present invention provides a device for overlaying an on-screen display (OSD) on a video image. The device includes storage for storing values of pixels of the OSD, means for substituting pixels of lines of the OSD that are to be displayed without processing for pixels of the video image, and means for subjecting pixels of lines of the OSD that are to be displayed after processing to a mathematical filter. The means for subjecting assigns the value of another pixel of the video image to each pixel of the video image that is required by the mathematical filter but presently unavailable, with the other pixel belonging to the same column as the required pixel.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

BRIEF DESCRIPTION OF THE DRAWINGS

FIG. 1 shows a conventional structure for the code of an OSD;

FIGS. 2a and 2b respectively illustrate the problems of flicker and flutter during the display of an OSD on a video image background; and FIG. 3 is a block diagram of a preferred embodiment of a circuit for implementing the method of the present invention.

DETAILED DESCRIPTION OF PREFERRED EMBODIMENTS

Preferred embodiments of the present invention will be described in detail hereinbelow with reference to the attached drawings.

FIG. 3 shows a circuit according to a preferred embodiment of the present invention. As shown, an OSD generation interface 30 is connected to an OSD insertion interface 32 by a first data bus 34. A video signal 36 that represents the original video signal is transmitted to the OSD insertion interface 32 by a first link 38. A processing interface 40 exchanges information with the OSD insertion interface 32 through a second data bus 42 and a third data bus 44. A fifth data bus 46 provides a connection between the OSD generation interface 30 and the processing interface 40. A control unit 48 controls some operations of the OSD generation interface 30, the OSD insertion interface 32, and the processing interface 40. The data elements or signals produced by the OSD insertion interface 32 are communicated to a television set 50 by a second link 52 (e.g., a wired or RF link).

The operation of the circuit of FIG. 3 in accordance with a preferred embodiment of the present invention will now be explained. Initially, all of the data elements pertaining to an OSD that is to be displayed on the screen are stored in the OSD generation interface 30. For each line of the OSD to be displayed, the values of the pixels are transmitted to the OSD insertion unit 32 at the same frequency as that at which the lines of the original video image are transmitted to the OSD insertion interface 32 over the first link 38. (Generally, a line of the OSD corresponds to a portion of a line of the screen.) When a line of OSD pixels is to be subjected to a mathematical filter, the values of the pixels of the current line of the OSD are transmitted to the processing interface 40 over the second data bus 42. If the mathematical filter being used is associated with an equation that requires knowledge of the values of other pixels of the OSD, these values are communicated to the processing interface 40 over the fourth data bus 46.

Further, if the mathematical filter is associated with an equation (or equations) that requires knowledge of the values of pixels of the original video image, then the values of the pixels of the current line of the original video image are transmitted to the processing interface 40 over the second data bus 42. The values of the pixels of the current line of the video image are used as the values of pixels of lines of the video image that play a part in the computations of the equations associated with the mathematical filter. Once the computations are made, the new values of the pixels of the current line of the OSD are transmitted to the OSD insertion interface 32 over the third data bus 44. The information on each pixel to be displayed is then transmitted to the television station 50 by the second link 52.

In the preferred embodiment of the present invention, the mathematical filter that is applied is associated with a unique equation. The present invention enables the application of the equation to an OSD line processing, which may require knowledge of the values of the pixels of the original video image or only knowledge of the values of the pixels of the OSD. For example, a mathematical filter associated with equations (1) or (2) described above can be used on all of the lines of the OSD. In one preferred embodiment, equations (1) and (2), which bring into play the values of the pixels of the line of the OSD being processed and the values of the pixels of the two neighboring lines, respectively use weighting coefficients of 0.5, 0.25, and 0.25 for these lines. In particular, when a boundary line of the OSD is processed, equation (1) is transformed into the following equation.

$$I_i^*(n) = 0.25 \times P_i(n-1) + 0.5 \times I_i(n) + 0.25 \times P_i(n) \tag{5}$$

where the value $P_i(n-1)$ is the value of the pixel of column i of line n of the video image.

The method of the present invention advantageously uses the fact that two successive lines only very rarely present pixels of very different colors in an original video image. Additionally, the method of the present invention advantageously uses the fact that changes in colors between two successive lines are not very numerous in a standard video image. Accordingly, the present invention provides a method for correcting flicker and flutter of an OSD on a video image.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method for correcting flicker and flutter of an on-screen display (OSD) on a video image, said method comprising the steps of:

storing values of pixels of the OSD;

substituting pixels of lines of the OSD that are to be displayed without processing for pixels of the video image; and subjecting pixels of lines of the OSD that are to be displayed after processing to a mathematical filter, wherein the subjecting step includes the sub-step of assigning the value of another pixel of the video image to each pixel of the video image that is required by the mathematical filter but presently unavailable, the other pixel belonging to the same column as the required pixel.

2. The method as defined in claim 1, wherein in the assigning sub-step, the required pixel is a pixel of the video image that is not covered by the OSD.

3. The method as defined in claim 2, wherein in the assigning sub-step, the other pixel belongs to the closest line of the video image that is covered by the OSD.

4. The method as defined in claim 1, further comprising the step of programming values for each pixel of the OSD.

5. The method as defined in claim 1, wherein the mathematical filter is associated with a single equation that is applied to all of the lines of the OSD that are to be processed.

6. The method as defined in claim 5, wherein the equation is:

$$I_i^*(n) = 0.25 \times P_i(n-1) + 0.5 \times I_i(n) + 0.25 \times P_i(n).$$

7. The method as defined in claim 1, wherein the mathematical filter is associated with a equation that uses the values of the pixels of the line of the OSD being processed and the values of the pixels of the two neighboring lines through weighting coefficients.

8. The method as defined in claim 7, wherein the weighting coefficients assigned to the line to be processed and to the two neighboring lines are 0.5, 0.25, and 0.25, respectively.

9. A machine-readable medium encoded with a program for correcting flicker and flutter of an on-screen display (OSD) on a video image, said program containing instructions for performing the steps of:

storing values of pixels of the OSD;

substituting pixels of lines of the OSD that are to be displayed without processing for pixels of the video image; and subjecting pixels of lines of the OSD that are to be displayed after processing to a mathematical filter, wherein the subjecting step includes the sub-step of assigning the value of another pixel of the video image to each pixel of the video image that is required by the mathematical filter but presently unavailable, the other pixel belonging to the same column as the required pixel.

10. The machine-readable medium as defined in claim 9, wherein in the assigning sub-step, the required pixel is a pixel of the video image that is not covered by the OSD, and the other pixel belongs to the closest line of the video image that is covered by the OSD.

11. The machine-readable medium as defined in claim 9, wherein said program further contains instructions for performing the step of programming values for each pixel of the OSD.

12. The machine-readable medium as defined in claim 9, wherein the mathematical filter is associated with a single equation that is applied to all of the lines of the OSD that are to be processed.

13. The machine-readable medium as defined in claim 12, wherein the equation is:

$$I_i^*(n)=0.25 \times P_i(n-1)+0.5 I_i(n)+0.25 \times P_i(n).$$

14. The machine-readable medium as defined in claim 9, wherein the mathematical filter is associated with a equation that uses the values of the pixels of the line of the OSD being processed and the values of the pixels of the two neighboring lines through weighting coefficients.

15. The machine-readable medium as defined in claim 14, wherein the weighting coefficients assigned to the line to be processed and to the two neighboring lines are 0.5, 0.25, and 0.25, respectively.

16. A device for overlaying an on-screen display (OSD) on a video image, said device comprising:

storage for storing values of pixels of the OSD;

means for substituting pixels of lines of the OSD that are to be displayed without processing for pixels of the video image; and means for subjecting pixels of lines of the OSD that are to be displayed after processing to a mathematical filter, wherein the means for subjecting assigns the value of another pixel of the video image to each pixel of the video image that is required by the mathematical filter but presently unavailable, the other pixel belonging to the same column as the required pixel.

17. The device as defined in claim 16, wherein the required pixel is a pixel of the video image that is not covered by the OSD, and the other pixel belongs to the closest line of the video image that is covered by the OSD.

18. The device as defined in claim 16, wherein the mathematical filter is associated with a single equation that is applied to all of the lines of the OSD that are to be processed.

19. The device as defined in claim 18, wherein the equation is:

$$I_i^*(n)=0.25 \times P_i(n-1)+0.5 \times I_i(n)+0.25 \times P_i(n).$$

20. The device as defined in claim 16, wherein the mathematical filter is associated with a equation that uses the values of the pixels of the line of the OSD being processed and the values of the pixels of the two neighboring lines through weighting coefficients.

* * * * *

UNITED STATES PATENT AND TRADEMARK OFFICE
CERTIFICATE OF CORRECTION

PATENT NO.    : 6,327,003 B1
DATED         : December 4, 2001
INVENTOR(S)   : Mark Vos It is certified that error appears in the above-identified patent and that said Letters Patent is hereby corrected as shown below:

<u>Column 7,</u>
Line 36, delete "$I_i^*(n)= 0.25 \times P_i(n-1) + 0.5I_i(n) + 0.25 \times P_i(n).$" and insert therefore
-- $I_i^*(n)= 0.25 \times P_i(n-1) + 0.5 \times I_i(n) + 0.25 \times P_i(n).$ --

Signed and Sealed this

Fourth Day of June, 2002

Attest:

Attesting Officer

JAMES E. ROGAN
*Director of the United States Patent and Trademark Office*